United States Patent [19]

Schickedanz

[11] 4,346,651
[45] Aug. 31, 1982

[54] TOASTER FOR BREAD AND OTHER FOOD ITEMS

[76] Inventor: Willi Schickedanz, Langener Strasse 70, 6050 Offenbach am Main, Fed. Rep. of Germany

[21] Appl. No.: 39,760

[22] Filed: May 17, 1979

[30] Foreign Application Priority Data

Oct. 13, 1978 [DE] Fed. Rep. of Germany ....... 2844650

[51] Int. Cl.³ ............................................. A47J 37/08
[52] U.S. Cl. ....................................... 99/392; 99/327; 99/335; 99/337; 99/339; 99/340; 99/344; 99/390; 99/419; 99/443 R; 99/448; 99/449; 219/345; 219/482; D7/91
[58] Field of Search ................. 99/389, 390, 391, 392, 99/393, 399, 448, 385, 427, 443 R, 449, 419, 401, 329R, 327, 337, 328, 344, 326, 331–335; D7/91, 92, 93; 219/345, 482; D6/185, 188, 189, 190; 211/40, 13; 312/12

[56] References Cited

U.S. PATENT DOCUMENTS

| | | | |
|---|---|---|---|
| 1,533,090 | 4/1925 | Black | 99/391 |
| 1,901,603 | 3/1933 | Juengst | 99/335 |
| 1,921,173 | 8/1933 | St. Maur | 99/335 |
| 2,059,440 | 11/1936 | Connolly | 99/327 |
| 2,262,498 | 11/1941 | Holm-Hansen | 99/401 |
| 2,360,026 | 10/1944 | Wall | 99/449 X |
| 2,374,302 | 4/1945 | Orkfritz | 99/327 |
| 2,400,640 | 5/1946 | Hanson | 99/335 X |
| 2,994,760 | 8/1961 | Pecoraro | 99/390 X |
| 3,416,430 | 12/1968 | Hauser | 99/391 X |
| 4,056,699 | 11/1977 | Jordan | 200/DIG.1 |

FOREIGN PATENT DOCUMENTS

| | | | |
|---|---|---|---|
| 935570 | 11/1955 | Fed. Rep. of Germany | 99/401 |
| 7031204 | 8/1970 | Fed. Rep. of Germany | 99/389 |
| 7202233 | 1/1972 | Fed. Rep. of Germany | 99/389 |
| 2130555 | 12/1972 | Fed. Rep. of Germany | 99/389 |
| 1254122 | 11/1971 | United Kingdom | 99/329 R |

Primary Examiner—Billy J. Wilhite
Attorney, Agent, or Firm—Karl H. Gross

[57] ABSTRACT

A toaster has a casing, two or more walls of which define between themselves an upright food-receiving space, and a base defining with the lower edges of these walls a clearance open to the food-receiving space. A separate food carrier is insertable into the clearance so that food-holding portions of the carrier project from the clearance into the space. Heating elements toast or warm the food in the space. Guides are provided to facilitate insertion and withdrawal of the carrier from the clearance.

2 Claims, 19 Drawing Figures

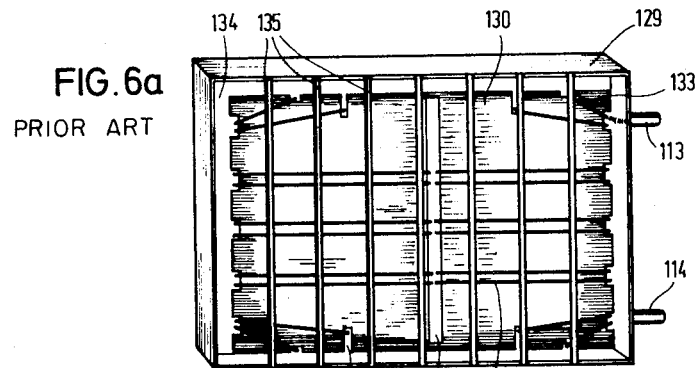
FIG.6a PRIOR ART
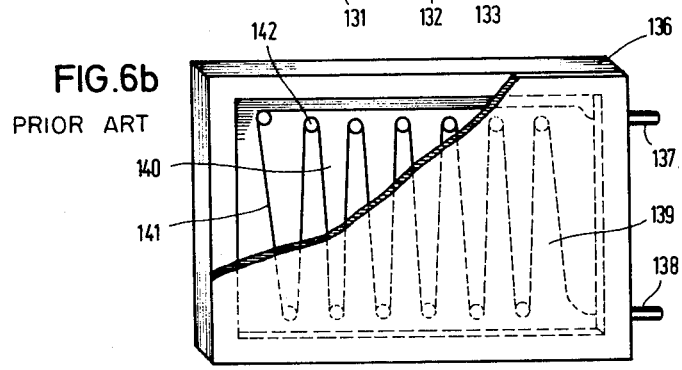
FIG.6b PRIOR ART
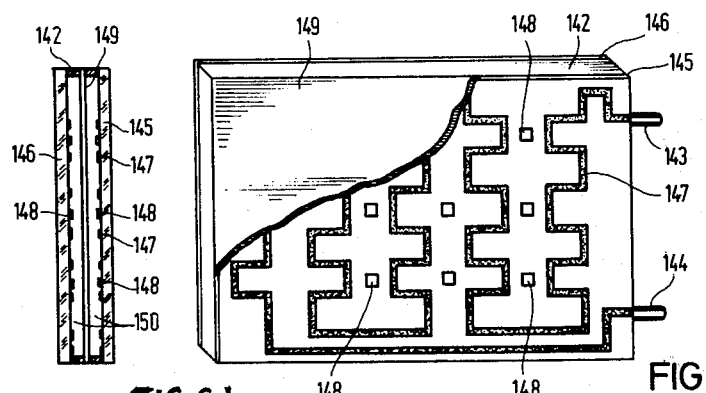
FIG.6d PRIOR ART
FIG.6c PRIOR ART

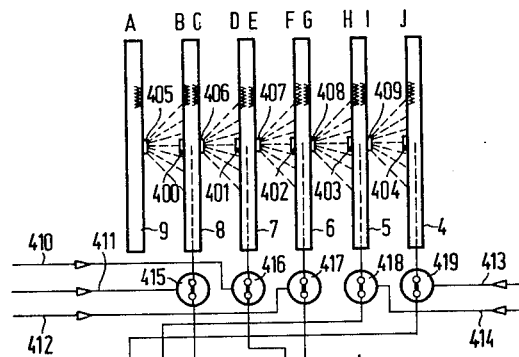
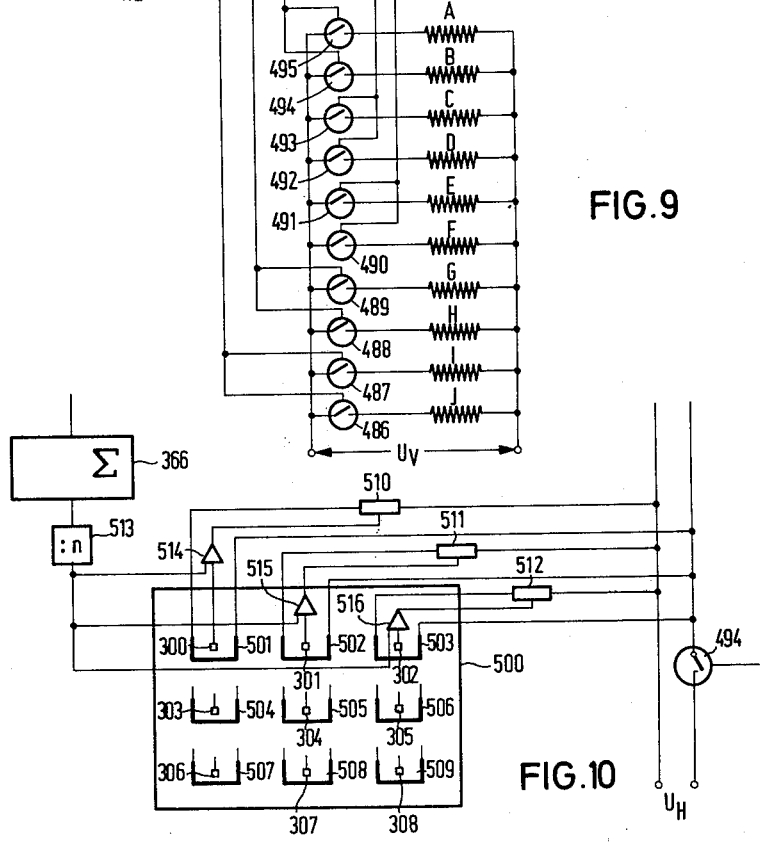
FIG. 9
FIG. 10

TOASTER FOR BREAD AND OTHER FOOD ITEMS

BACKGROUND OF THE INVENTION

1. Field of the Invention

This invention relates to toasters, i.e. devices for heating and/or browning bread, rolls, muffins and other food items.

More particularly, the invention relates to a novel toaster which requires less space, is more efficient and can be more easily handled than those known heretofore.

The invention also relates to a toaster having improved circuitry for controlling its operational functions.

2. The Prior Art

Toasters are per se well known in a large variety of types and are used in households, as well as commercially, to brown (i.e. "toast") slices of bread, muffins or the like, and also to toast other items of food and/or to warm such items. Early models of electric household toasters were first marketed in the early 1900's and automatic toasters came on the market about 1930.

The type of toaster used in household applications usually has a square or rectangular housing provided in its top surface with one or two (sometimes up to four) slots into which slices of bread or similar food items are partially inserted. Thereafter the user depresses a handle which causes the food items to be mechanically lowered into the interior of the housing, to bring them opposite the electrical heating elements which then effect the toasting. A device is usually provided for varying the degree to which the items are toasted (i.e. just how light or dark the process is to make them). When the selected degree of toasting is approximately reached (exact selection of color is not possible), an ejector mechanism abruptly raises the food items through the slots back to their original position in which they extend partially from the housing, so that they can be manually removed.

To be perfect for consumption the toast should be crisp, not "soggy". This cannot be achieved if the food items are removed from the toaster and "piled together" on a plate or in a basket, because small amounts if moisture inherent in the articles are being expelled due to the heating which the articles have undergone. If the e.g. slices of toast are in immediate proximity with one another, the moisture of each slice cannot properly escape or, if it does, simply re-enters the adjacent slice; the result is "soggy" toast. To avoid this problem, toast racks have been developed which hold the slices of toast upright and spaced from one another so that escaping moisture can dissipate to the ambient air and the toast remains crisp and dry. These toast racks are entirely separate items from the toasters themselves.

The known toasters suffer from various disadvantages. One of these is the fact that a relatively complicated mechanical arrangement must be provided to first lower and then raise the slices of bread; this invites malfunctions and is reflected in the price of the toaster. Moreover, once the toast "pops up" it is quite hot and manual removal of the slices—with concomitant burning of the remover's fingers—can be unpleasant. Aside from this, it is generally not desired that the toast should be touched repeatedly before it comes to the table for consumption.

Other types of toasters are also known. For example, commercial high-volume toasters are known from e.g. German Pat. No. 1,778,923 and German Published Applications Nos. 2,333,619, 1,946,901 and 1,654,919. A flip-type toaster, i.e. one in which the toast slices are flipped relative to the heating elements and which has no mechanism for raising or lowering the slices, is made by the German Siemens Corporation (Type TT 8000). A toaster having a variable-volume toasting chamber is known from German Published Application No. 2,130,55. Aside from the complexity of their construction, all these toasters also require manual removal of the toasted slices, leading to potential burning of the user's fingers and requiring touching of the toast before it comes to the table for consumption.

SUMMARY OF THE INVENTION

It is a general object of the present invention to overcome the disadvantages of the prior art.

More particularly, it is an object of the invention to provide an improved toaster which is not possessed of these disadvantages.

Another object of the invention is to provide an improved toaster in which a toast rack is an integral component of the toaster per se, so that the need for touching of the done toast prior to serving of the same is eliminated.

A concomitant object of the invention is to provide a toaster of the type under discussion which embodies improved circuitry for precisely selecting the exact degree of toasting (i.e. color) desired and for obtaining exactly that degree of toast color.

Still a further object of the invention is to provide such a toaster wherein the need for mechanism to lower and raise the slices of bread or the like is eliminated.

Another object is to provide a toaster having a variable-volume toasting chamber, thus making it possible to use the toaster for toasting or warming of objects which do not fit the usual inlet slot, such as e.g. rolls or the like.

An additional object is to provide a toaster having two or more toasting chambers and circuitry for selecting and operating the heating elements of only certain ones of these chambes, i.e. of those chambers which actually contain an item to be toasted, in order to save electrical energy in the operation of the toaster.

Still another object of the invention is to provide a toaster wherein the switching-on and the switching-off of all or of only some of the heating elements can be pre-programmed, so that the delivery of finished toast can be accommodated to the known or anticipated speed of toast consumption.

In keeping with these objects, and still others which will become apparent from a resulting of the description following hereafter, one aspect of the invention resides in a toaster having a casing with at least two walls which define between themselves a space dimensioned to receive food items to be toasted; a discrete carrier including means for holding food items in requisite orientation; means operative in response to relative movement of the casing and discrete carrier, for causing a food item on the carrier to enter into the space and to be extracted therefrom, depending upon the direction of the relative movement; and means for toasting food items located in the space.

BRIEF DESCRIPTION OF THE DRAWING

FIG. 6a is a perspective view showing one type of heating element for use with the various embodiments of the novel toaster;

FIG. 6b is a perspective view, showing another type of heating element;

FIG. 6c is a perspective view, showing still another type of heating element;

FIG. 6d is a section of FIG. 6c;

FIG. 9 is a diagram of a third control circuit according to the invention;

FIG. 10 is a diagram showing a fourth control circuit according to the invention;

DESCRIPTION OF PREFERRED EMBODIMENTS

Figure 1:
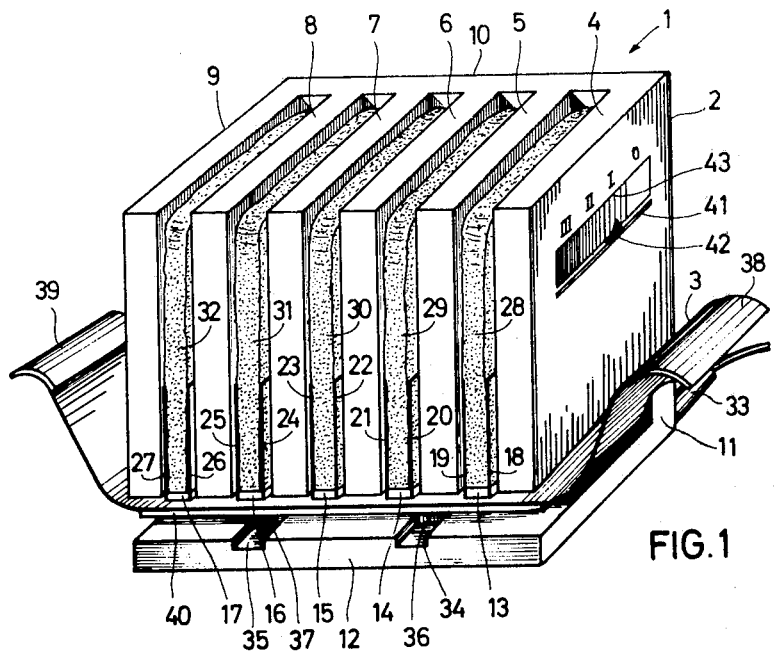
FIG. 1 is a perspective view of a toaster embodying the invention.
Figure 2:
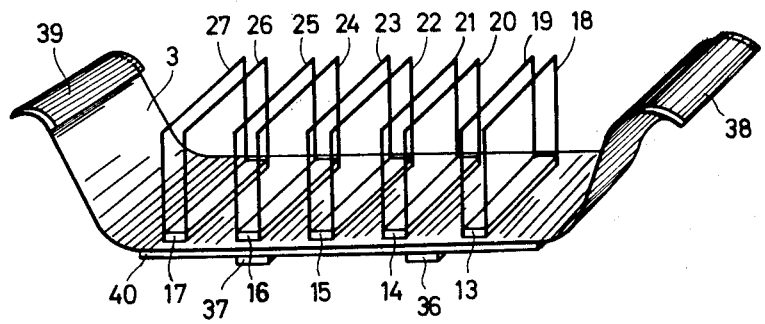
FIG. 2 is a perspective view of a component of the toaster in FIG. 1.

A first embodiment of the invention is illustrated in FIGS. 1 and 2. The toaster 1 in these Figures has a toasting unit 2 and a toast rack 3 forming an integrated part of the toaster.

Toasting unit 2 includes a base plate 12 on which the toast rack rests when the toaster is in operation. The plate 12 is connected with a rear upright wall 10 of the unit 2 by a web 11. A plurality of plate-shaped parallel heating sections 4-9 (having heating elements to be of any of the types described with reference to FIGS. 6a-6d) is mounted on the rear wall 10 and projects forwardly of the same, so as to define the spaces between themselves into which food items to be toasted (e.g. the illustrated bread slices 28-32) can be inserted. The vertical height of the web 11 is sufficiently large for a gap to exist between the lower edge of the heating section 4-9 and the base plate, into which gap the toast rack 3 is laterally insertable.

The toast rack is provided (FIG. 2) with several raised portions 13-17 each of which serves to support a slice of bread 28-32 to be toasted. To keep these slices in upright position, each of the raised portions 13-17 is surrounded at opposite sides by two frames 18-19, 20-21 . . . 26-27. When the toast rack 3 is laterally inserted into the gap between the heating sections and the base plate 12, to place the bread slices into proximity to the heating elements (not shown) arranged in the heating sections 4-9 and supplied with electrical energy via the connection 33, care must be taken that the insertion takes place in exactly the proper orientation. For this purpose guide means are provided, here illustrated in form of two grooves 34, 35 in base plate 12 and tongues or rails 36, 37 on the rack 3 which fit into these grooves. The rails 36, 37 are preferably of heat-insulating material (e.g. a synthetic plastic, such as PET or the like) which, when the rack 3 is later placed on a table with the toast slices, protects the table against damage from the hot rack 3.

Insertion and removal of rack 3 is advantageously accomplished by grasping the outer end portions of the rack. To protect the fingers of a user against possible burns, the outer end portions may be provided with insulating material 38, 39 (e.g. bakelite or a synthetic plastic material such as is commonly used for this purpose in toasters). A heat energy retaining plate 40 of e.g. ceramic material may be mounted at the lower side of rack 3, it will become heated during toasting of the bread slices and, when the rack is removed from the toasting unit 2, will retain heat and thus prevent too-quick cooling of the toast.

The toasting unit 2 is provided with a slot 41 in which a lever 42 is slidable to select the desired degree of browning (i.e. toasting) of the bread slices. A scale 43 is provided above or below the slot 41 and indicates a series (here four) degrees of toasting, e.g. O, I, II, III to which the lever can be set. Of course, the number of settings can be smaller or larger, or the settings can be continuously variable. The circuitry for carrying out the commands set with the lever 42 may be of the type commonly known from existing toasters or, preferably, it may be of any of the types according to the invention which will be discussed later herein.

Figure 3:
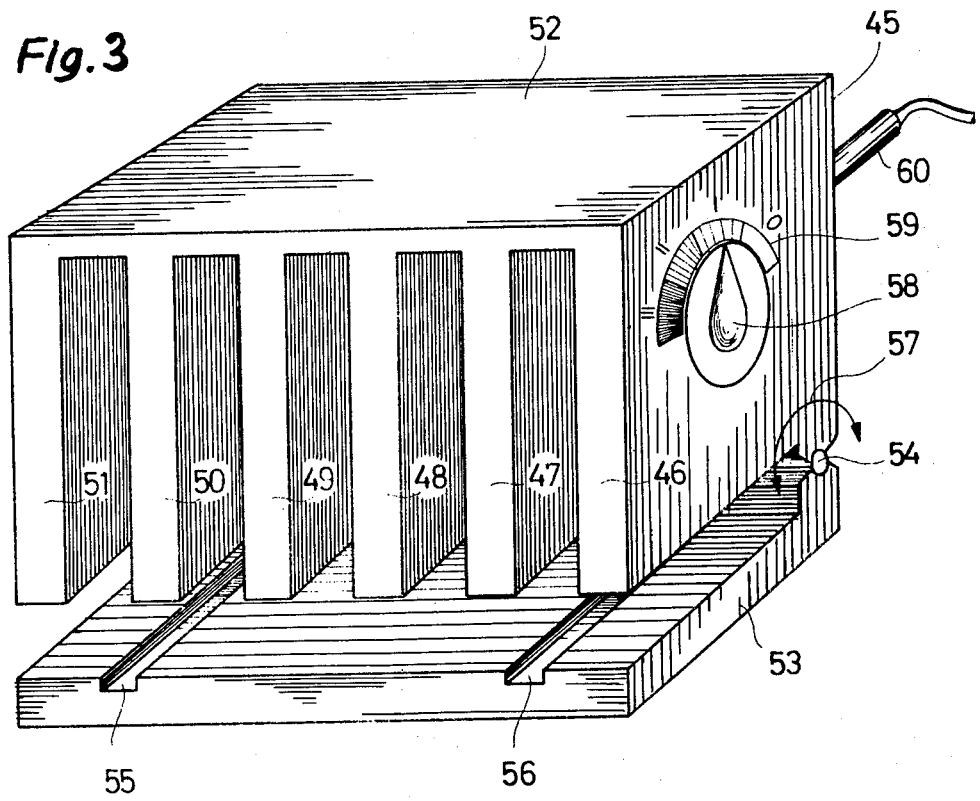
FIG. 3 is a perspective view of another embodiment of the novel toaster.

The embodiment of FIG. 3 is essentially similar to that in FIGS. 1 and 2. The major difference in this embodiment is that the toasting unit 45 has a closed top and is tiltably mounted on the base 53 via a pivot hinge 54. This makes it possible to tilt the unit 45 relative to the base 54 in the direction indicated by the arrow 57. The plate-shaped heating section—each with its internal not-illustrated heating element of the kind mentioned before—are again arranged parallel to one another and so connected at their upper ends as to form the closed top surface 52 of the toasting unit 45. Base 53 is again provided with two (or more) grooves 55, 56 into which the corresponding rails (see elements 36, 37 in FIG. 2) of a toast rack corresponding to the one in FIGS. 1 and 2 can be inserted. Of course, in this embodiment the insertion of the rack into the toasting unit is different from the preceding embodiment, in that the toasting unit 45 is tilted back (away from the base 53), whereupon the rails of the toast rack are inserted into the grooves 55, 56 from above and the toasting unit 45 is tilted forwardly (towards the base) again. The slices of bread or other food items held by the toast rack will, during the latter movement, enter into the space defined between the heating sections 46-51 and thus into position for toasting.

One narrow side of the toasting unit 45 is provided with a turn switch 58 for selecting different degrees of toast color (i.e. of doneness of the toast). Four different degrees are illustrated by way of example, shown on dial 59 having the setting indicia 0, I, II and III. Turning the switch 58 controls the operation of the toaster circuitry, for example one of the circuits to be described later herein, or a (not illustrated) potentiometer which is adjusted according to the setting of the switch 58 and increases or reduces the flow of electricity entering the toaster via the electrical supply line 60. This latter possibility is, of course, known per se in this art.

Figure 4:
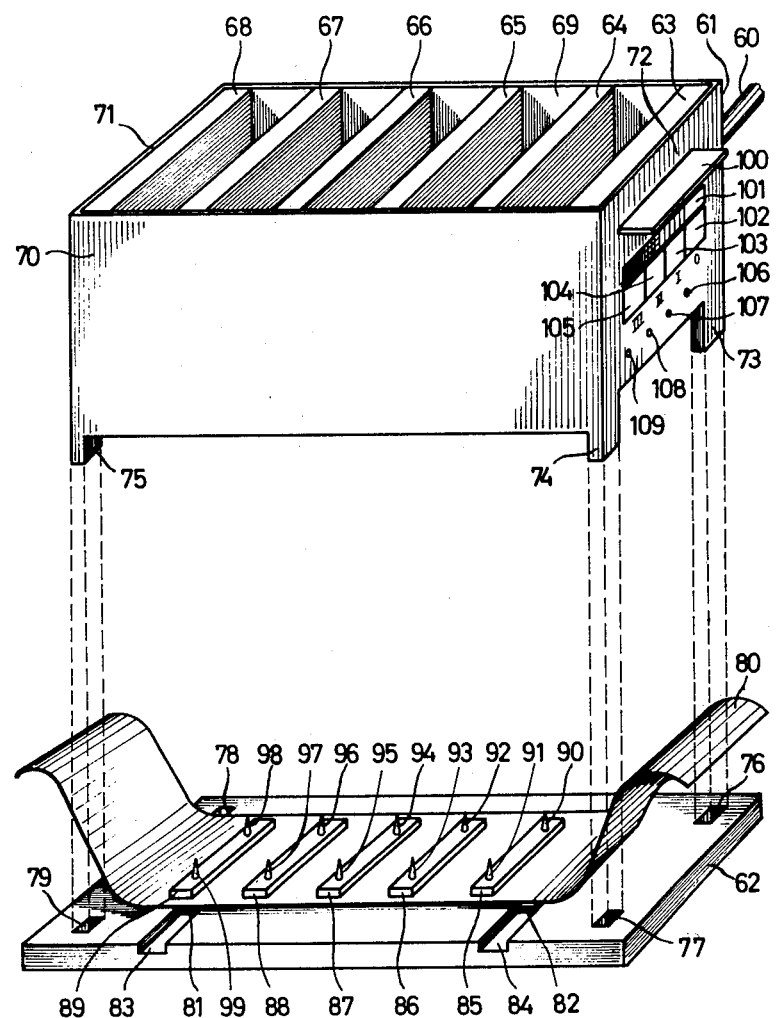
FIG. 4 is an exploded perspective, showing a further embodiment of the toaster.

In the embodiment of FIG. 4 the toasting unit 61 can be completely separated from its base 62, instead of being permanently mounted on the same. Here, the toasting unit 61 again has a plurality of parallel heating sections 63-68, each provided with an internal (not illustrated) heating elements as before. Each two adjacent sections 63/64, 64/65, etc. form with one another a space or slot for a food item to be toasted. At their respective longitudinal ends the sections 63-68 are connected with sidewalls 69 and 70, respectively. These latter form, together with endwalls 71 and 72, the housing and outline of the toasting unit 61. To support the unit 61 on the base 62 the underside of the unit is provided at its corners with four legs, of which only the legs 73, 74 and 75 are visible. Each of the four legs is receivable in a corresponding depression 76-79, respectively, in the base 62, so as to assure proper alignment of the unit with the base.

The toast rack in this embodiment is designated with reference numeral 80 and again has two rails or bars which are receivable in guide grooves 83, 84 formed in the base 62. Unlike the preceding embodiments, the toast rack 80 is not provided with bread-retaining frames. Instead, its raised bread-supporting portions 85-89 each have two or more (two shown) tips or pins 90-99 on which the respective bread slices are speared.

In this embodiment the toasting unit 61 must be raised from—and later be lowered down onto—the base 62. For this purpose it is provided with handles 100 on its endwalls 71, 72. One of these endwalls, here the endwall 72, is provided below its handle 100 with an arrangement for setting the desired toast color, i.e. degree of toasting. In FIG. 4 this is a dial 101 subdivided into four fields 0, I, II and III, each identifying one of the possible toast colors which can be set. Below these fields on the dial 101 are arranged respective pushbuttons 102, 103, 104 and 105 and each of these in turn is associated with an LED (light-emitting diode) 106-109, respectively. Depressing one of the pushbuttons, e.g. the button 103, causes the associated LED, here the LED 107, to become energized for the duration of the toasting process. When the toasting process ends, the bread slices in the toaster will have the toast color symbolized by the indicium I, i.e. in the normal arrangement where a lower setting indicates a lower degree of toasting, they will be lightly toasted. Of course, it will be understood that depressing of any one of the pushbuttons will not only energize the associated LED, but also the heating elements of the heating sections 63-68.

For safety reasons it may be desired to permit energization of the toasting unit only after the same has been put into place on the base 62.

Figure 5:
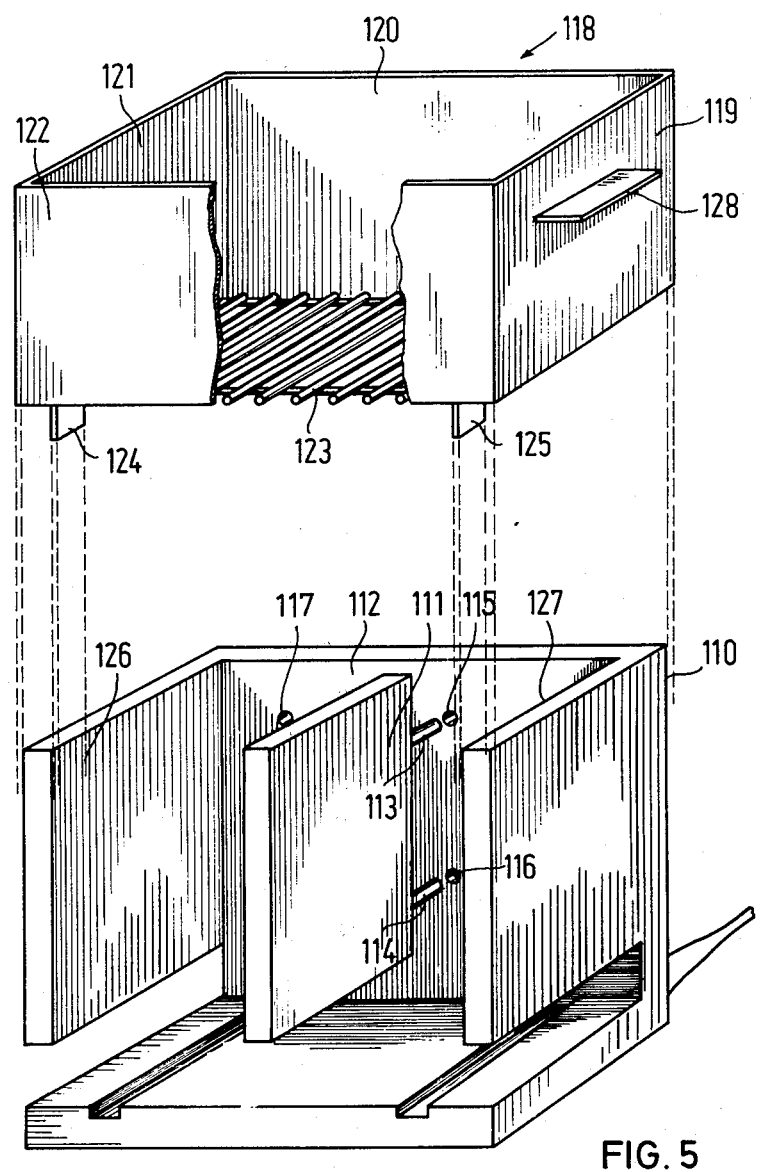
FIG. 5 is another exploded perspective, showing still a further embodiment of the toaster.

The embodiment shown in FIG. 5 is reminiscent of the one in FIG. 1 in its basic construction. It is, however, suitable not only for toasting standard slices of bread, but also for toasting other food items which are thicker than standard slices (or bread slices which are thicker than the standard slices). In addition, this embodiment makes it possible to warm rolls or other food items by way of a special adapter.

Basically, the embodiment of FIG. 5 resembles the one in FIG. 1, as already mentioned. It has a toasting unit 110 which, however, has at least its inner heating sections 111 (only one shown for simplicity) removably connected to the rear wall 112 of the toasting unit. To make this possible each of the sections 111 (containing in its interior a non-illustrated heating element) is provided with two electrical terminal pins 113, 114 which can be inserted into corresponding sockets provided in the rear wall 112. Evidently, current supplying instrumentalities (wires, bus bars) will be provided within the wall 112 to be contacted by the terminal pins 113, 114. It will be clear that the space for reception of a food item (i.e. the space between adjacent ones of the heating sections) can be increased or decreased as required, merely by removing or adding the requisite number of sections 111.

A receptacle 118 is provided by means of which rolls, buns or other food items may be heated or kept warm. The receptacle 118 is an upwardly open box having four sidewalls 119-122 and a bottom wall 123 which is preferably configurated as a grate or grid, but could also be a perforated plate or perhaps even a non-perforate plate. The receptacle 118 is provided with four feet (only the front feet 124, 125 are visible) which slide along the inner sides 126, 127 of the heating sections when the receptacle is put in place on the toasting unit 110, thus assuring proper positioning of the receptacle and arresting of the same against lateral displacement relative to the toasting unit 110. The sidewalls 119 and 121 are provided with handles 128 so that the receptacle can be lifted off or put in place.

This embodiment uses one of the toast racks shown in FIGS. 2 and 4.

Some possible embodiments of the heating sections used in the toaster according to the present invention, and of their heating elements, are illustrated in FIGS. 6a-6d. In all instances these heating sections may be so constructed that they radiate from either one side or from both sides.

FIG. 6a shows a heating section of a type known from prior-art toasters. It has a housing 129 in which there is mounted a thin, heat-proof plate 130 (of e.g. mica) having a plurality of cut-outs 131 and depressions 132. A coil 133 of resistance wire is wound about the plate 130 so as to be located in—and held in place by—the cut-outs and depressions 131, 132 and to have different ones of its porions located on the opposite major surfaces of the plate 130.

When electrically energized, the coil 133 radiates heat to both sides (i.e. from both major surfaces) of the plate 130. However, the housing 129 has a mirrored rear wall 134 which reflects that heat which is radiated from the rear side of the plate 130, forwardly in the same direction as the heat radiated from the front side of the plate. The front side of the housing is provided with a series of bars 135 (or a grid) to prevent contact of the user's fingers with the heating coil 133.

The heating section shown in FIG. 6b has a frame 136 provided with electrical terminals (pins) 137, 138. At least the front side of the frame (the term "front" always refers to the side which faces towards the food to be toasted) is provided with a glass plate 139 which defines with the rear wall 140 (which may be of glass or another material, such as metal) a chamber in which an electrical resistance wire 141 is wound over and around projections 142 which may be separate elements or may be projecting portions of the plate 139 and/or the rear wall 140. It is currently preferred to either evacuate the chamber or to fill it with a chemically inert gas. The construction in FIG. 6b is known from the art and described in German Published Application OS No. 2,635,921 to which reference may be had for details.

FIG. 6c illustrates an embodiment having a frame 142 provided with two electrical terminals 143, 144 and having at its front end and rear sides respective glass plates 145, 146. The inner surfaces of the plates 145, 146, i.e. the surfaces which face one another across the interior of the frame, are provided with e.g. sprayed-on or vapor-deposited electrical circuits 147. In the spaces between these circuits are arranged optical sensors 148 which are connected to not-illustrated electrical wires or similar conductors. The purpose and operation of these sensors 148 will be described later on. A metal plate 149 having both of its major surfaces mirrored, is mounted in the space between the two circuits 147, 147 on the respective plates 145, 146 to reflect the heat resulting on energization of the circuits 147. The hollow 150 (FIG. 6d) between the plates 145, 146 and the metal plate 149 may be evacuated or filled with chemically inert gas.

The construction and operation of the circuits 147 is known from e.g. French Allowed Application No. 2,189,562 and British Pat. No. 1,102,126.

It should be understood that the heating element embodiments in FIGS. 6a–6d are by no means exhaustive. Other such elements which can be used in the various embodiments of the toaster according to the present invention are, for instance, described in U.S. Pat. Nos. 4,052,588; 3,316,390; 3,629,555; 3,694,624; 3,612,827; 3,961,157 and 3,346,721, to which reference may be had.

Exemplary embodiments of control circuits for the toaster disclosed herein are illustrated in FIGS. 7–10.

Figure 7:
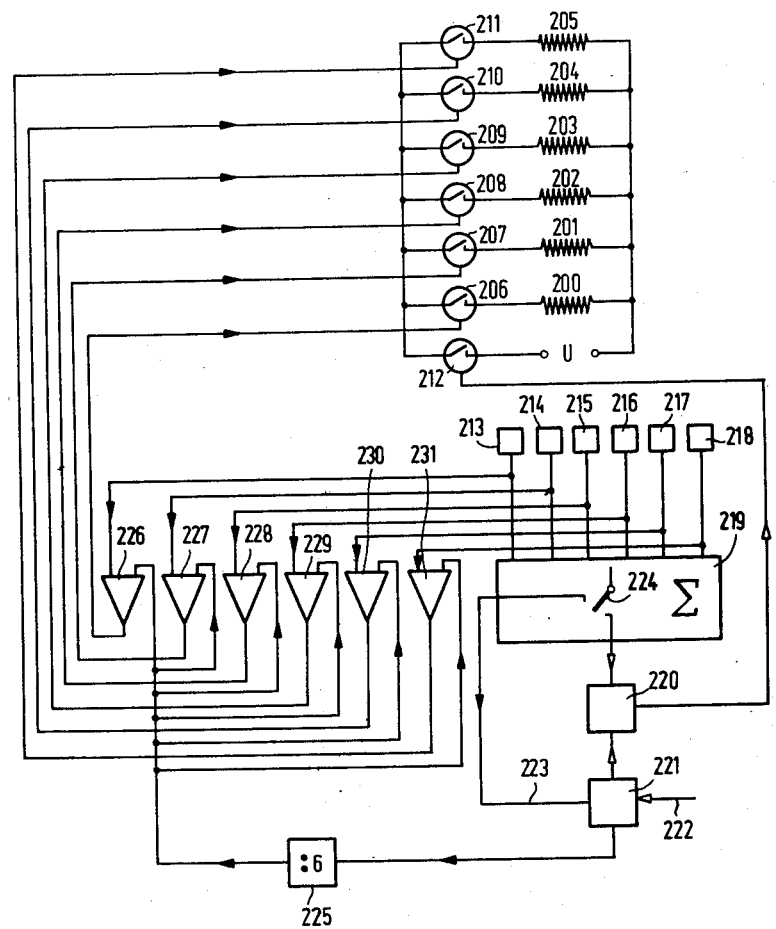
FIG. 7 is a diagram of a first control circuit according to the invention.

The control circuit in FIG. 7 permits the user to select the degree to which a food item (e.g. a slice of bread) will be toasted. For purposes of better explanation it will be assumed that each of the six heating sections 4–9 in FIG. 1 is provided with only a single heating element (e.g. resistance) which can be connected to a supply of electrical energy via a suitable switch. These six resistances are designated in FIG. 7 with the reference numerals 200–205, respectively; the switches for connecting them individually to a source of energy U are designated with reference numerals 206–211. Each of the resistances is connected in series with its associated switch; these six series circuits are connected in parallel with one another and are connectable to the energy source U via a main switch 212. This means that the resistances may be disconnected from the source U individually or all at once. Individual resistances are disconnected from the source U when the degree of toasting of e.g. a slice of bread being toasted by heat from that particular resistor exceeds a predetermined threshold value. Disconnection of all resistances jointly from the source U is effected when the mean toasting degree of all slices being toasted exceeds a predetermined value.

To be able to carry out the aforementioned operations it is necessary to determine the degree of toasting of each e.g. bread slice. For this purpose the heating sections are provided with optical sensors 213–218, respectively, which correspond to sensors 148 of FIG. 6c and are each so arranged as to face towards the bread slice being toasted. The values measured by the sensors are supplied to the adder 219 which determines the sum of the measured degrees of brown-ness. The thus determined sum is then supplied as a signal to a comparator 220 which compares it to a predetermined reference value derived from a reference-value store 221. This reference value can be varied via an input 222 and calibrated via conductor 223; the calibration is done by supplying, at the beginning of the measuring period, the summation signal via a switch 224 to the reference-value store 221. If and when the actually sensed degree of browning of the toast slices exceeds the preset reference value, the comparator issues a command signal to the main switch 212, causing this switch to open and thus de-energizing the toaster.

If a particular slice of toast has reached and exceeded the predetermined degree of browning, the heating circuit responsible for the toasting of this slice is to be de-energized irrespective of whether or not others of the circuits still continue to operate. For this purpose a median degree of browning (related to a single one of the heating elements) is determined by dividing the reference value of the store 221 into the number of sensors 213–218, i.e. in this embodiment, six. This is carried out in a divider 225 and the thus obtained individual reference value is now compared with the respectively sensed actual degree of browning in comparators 226–231, i.e. one for each heating element. If the actual degree of browning sensed for a particular slice of toast by the associated sensor 213–218 exceeds the individual reference value, then that one of the switches 206–211 which is associated with the sensor in question is opened to de-energize the heating element in question.

Figure 8:
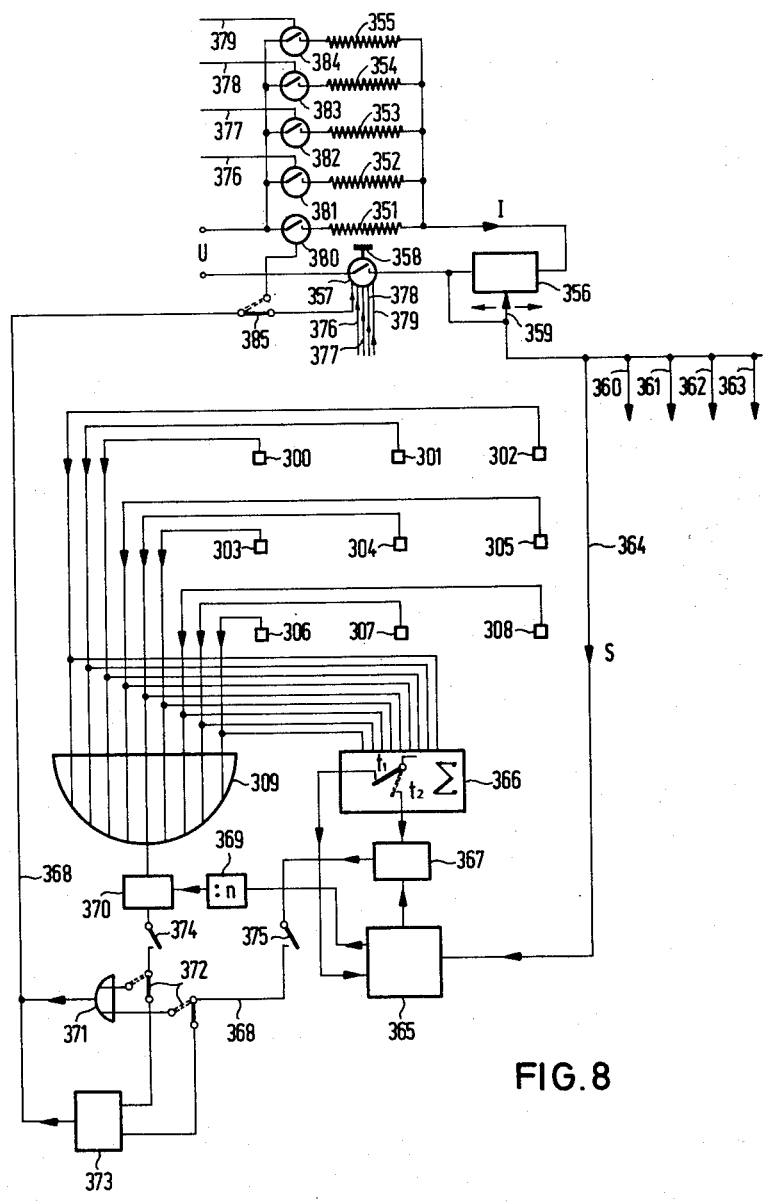
FIG. 8 is a diagram of a second control circuit according to the invention.

The circuit embodiment in FIG. 8 shows, in principle, another approach to setting and controlling the desired degree of toasting. This Figure illustrates the circuit of only one of the several heating sections (e.g. elements 4–9 in FIG. 1) provided in the toaster, it being understood that each heating section of the toaster will be provided with such a circuit if this embodiment is adopted.

The principal functional difference between the embodiment in FIG. 8 and that of FIG. 7 is that in FIG. 8 the instantaneous degree of toasting (browning) of each slice of bread is scanned not by a single sensor, but by a plurality of sensors as indicated previously in FIG. 6c.

Heating resistances 351–355 (which may e.g. be provided in the heating sections 4, 5, 6 of FIG. 1) are connectable in parallel with one another by switches 380–386. The voltage U, e.g. alternating current of 220 V or 110 V, is applied to the series connection of the resistances and a variable resistor 356 of the slidably adjustable type. This resistor serves to vary the total current I in the heating current circuit, thus permitting the resistances 351–355 to be heated to a greater or lesser degree, whereby the slices of bread can be toasted more or less, as desired. A switch 357 has a manually actuatable knob 358 which, when depressed, closes the electrical circuit to supply energy to the resistances; although manually completed the circuit can, however, be automatically opened (interrupted) again in response to an appropriate command to the switch 357. This will be explained below.

It will be understood that the position of the slider 359 of the resistor 356 may correspond to the position of the lever 42 of FIG. 1; i.e. its position may indicate a certain selected degree of toasting. As indicated by the arrows 360–363 which are symbolic of additional heating circuits the degree of toasting set by the position of the slider 359 is valid for all of the heating sections of the toaster. A signal S which is proportional to the degree of toasting selected with the slider 359, is supplied via conductor 364 to a threshold circuit 365 which is known per se. If the threshold set by the circuit 365 is exceeded, the toaster is disconnected from the energy source U. Each heating section, such as the one shown, has several optical sensors 300–308 (known per se) distributed over the area facing the slice of bread to be toasted. The sensors may be photo-electric diodes, photo-electric resistors or other light-sensitive elements.

The basic difference between the embodiments in FIGS. 7 and 8 and those known constructions which attempt to obtain uniform slices in a toaster, is that the embodiments in FIGS. 7 and 8 effect absolute—rather than indirect—measuring of the degree of toasting. This is an important difference. In the prior-art indirect measurement embodiments, the degree of toasting is merely inferred from the length of time for which the toasting process has been proceeding, or else from the current strength or the moisture of the slice of bread, or similar factors. The present invention, however, senses the degree of actual toasting directly, based on the fact that a strongly toasted slice of bread will invariably have a darker color than a less strongly toasted slice. Thus, the degrees of toasting correspond to the color of the bread slices which is determined with the aid of the sensors, such as the sensors 300–308.

To be able to exactly determine the final degree of toasting (i.e. the degree of toasting at which the toaster is to be switched off) it is necessary to determine the degree of toasting (color) at the beginning of the toasting operation and to compare it with the preset threshold value (i.e. the value at which the toaster is to switch off). A factor to be considered in this connection is that untoasted slices of bread may have different color. For example, a slice of white bread will evidently be lighter in color than a slice of rye bread or whole-grain bread to be toasted. Another factor to be considered is that the toaster may be placed in a lighter or darker environment. In other words, it is necessary to take account of the different starting conditions. According to the invention this is accomplished by shifting the threshold value set by the signal S by an amount corresponding to the starting color or light. This means that the threshold value set in the circuit 365 is determined not only by the signal S but also by the basic light condition. This basic light condition is determined by the sensors 300–308 which supply a signal that is proportional to the sensed degree of basic light or color. These signals are supplied to an adder 366 which forms their sum and furnishes a corresponding signal to the threshold circuit 365 at the beginning ($t_1$) of the toasting operation. After a predetermined time ($t_2$), which may be determined by a not-illustrated timer or similar device, this summation signal (which e.g. corresponds to the average lightness of the bread to be toasted) is supplied to a comparator 367. The comparator 367 then continuously compares the threshold value set in the circuit 365 with the actual lightness (color) of the bread being toasted. The actual lightness of course changes constantly during the toasting operation and when the strength of the two signals (i.e. the signal indicative of the actual lightness and the threshold value) coincides, the bread will have reached its desired degree of toasting. When this occurs the comparator supplies a signal via conductor 368 to the switch 367 to open the same and stop the toasting operation.

It may be desired to stop the toasting when only a certain part of the bread slice has reached a certain degree of toasting. If so, the toasting operation may be stopped by a single one of sensors 300–308. For this purpose the threshold value set in the threshold value circuit 365 is divided by n in a divider 369, with n representing the number of sensors 300–308. The resulting value is then supplied to a further comparator 370 which compares the actual measurements made by the individual sensors 300–308 (which are supplied to it via an OR gate 309) with the threshold values arriving from the divider 369. When the two signals coincide, the switch 357 receives a command signal causing it to open and to stop the toasting operation. The signal is furnished to switch 357 via an OR gate 371 which may be a simple OR gate or an EXCLUSIVE OR gate, depending upon whether the integral and/or point-like measurements of the degree of toasting are to operate in parallel or not. FIG. 8 shows that it is also possible to provide a selector switch 372 which permits one to switch from an EXCLUSIVE OR gate 373 to a simple OR gate 371, and vice versa. Additional switches 374, 375 permit the integral and/or point-like measurement of the degree of toasting to be switched off.

As mentioned before, the arrangement shown in FIG. 8 may be provided for each of the several heating sections of the toaster; this is indicated in FIG. 8 by the lines 376–379 via each of which the main switch 357 can be operated. If the several heating sections (e.g. 4–9 in FIG. 1; 46–51 in FIG. 3; 63–68 in FIG. 4) are to be capable of being switched off individually when the respectively associated slice of bread has reached the desired degree of toasting, then automatically operable switches 380–384 may be provided in the individual heating circuits of these sections, and selecting switches can be used to effect a selection between switching-off of the complete toaster or of individual ones of the heating sections. One such selecting switch is shown in FIG. 8 at 385, it being understood that additional ones may be provided which can connect the lines 376–379 either to the main switch 357 or to the respective switches 380–384.

In conventional multi-slice toasters (i.e. toasters having chambers for more than one food item to be toasted) the heating sections of all chambers are energized when the toaster operates, irrespective of whether slices of bread or other food items are in fact present in all of the chambers. Heating empty ones of the chambers is evidently wasteful, both in monetary terms and in terms of energy use. Such waste is prevented by the arrangement according to FIG. 9 of the present invention.

In the embodiment of FIG. 9 the six heating sections 409 of FIG. 1 are diagrammatically illustrated to facilitate understanding. The heating circuits of the inner sections 5–8 are each provided with two and those of the outer sections 4 and 9 are each provided with one heating resistance A-J, respectively. The same resistances A-J are additionally illustrated in their circuit context in the lower portion of FIG. 9.

The source of energy $U_V$ is connected with the parallel-connected resistances A-J and these latter are in turn each connected in circuit to respective switches 486–495. The switches 486–495 can be operated by light-sensitive elements 400–404 (e.g. photoelectric sensors) which are located opposite a light-emitting element 405-409. If, now, a food item such as a slice of bread is inserted into one of the toasting chambers (e.g. the space between the sections 7 and 8), then the light from the element 406 is blocked from reaching the associated element 401; therefore, the switches 492, 493 are closed and the resistances C and D are connected to the source $U_V$. It is clear, therefore, that with the arrangement of FIG. 9 only the heating circuits of those sections are energized in which a slice of bread is present. The amount of electrical energy (and money) saved in this manner during the operation of e.g. a five slice toaster (as shown in FIG. 9) with only one or two slices of bread being present, is considerable.

To be readily differentiated from ambient (e.g. day) light and from the infrared radiation of the resistances A-J, it is advisable—but not absolutely necessary—for the elements 405-409 to radiate in the ultraviolet range. If so, the elements 400-404 must then, of course, be of the type which receives in the ultraviolet range. Both types of elements are known per se.

The embodiment of FIG. 10 shows how the sensors 300-308 of FIG. 8 can be used to effect localized regulation of the toasting temperature. Each sensor 300-308 of a heating circuit 500 is surrounded by its own heating resistance 501-509, respectively. In FIG. 10 these resistances 501-509 are shown as of U-shaped configuration; in practice, however, they may have any desired shape. In this embodiment each of the resistances 501-509 heats (and therefore toasts) only a certain localized portion of a slice of bread; each of these resistances is connected to the source of energy $U_H$ via its own current regulator; for simplicity only the regulators 510-512 are shown. Each regulator 510-512 etc. supplies current to the associated resistance when the bread-slice area sensed by the associated sensor 300-308 is toasting too slowly (i.e. at less than average rate). If, on the other hand, the area is being toasted too fast, then the supply of current to the particular resistance is reduced or interrupted. For this purpose the mean value of the average degree of toasting present during a toasting operation at a predetermined time during the toasting operation, is determined via the adder 366 (see FIG. 7) and a divider 513; the thus obtained value is compared via a respective comparator 514, 515, 516 with the actual degree of toasting of the respective bread-slice area. The current regulators 510-512 etc. can then be controlled in dependence upon the average value so that all areas of the bread slice are toasted uniformly and at an equal rate of speed.

It goes without saying that the arrangement of FIG. 10 can be used in combination with the arrangements shown in FIGS. 7, 8 and 9, respectively, since the current regulation effected with the FIG. 10 arrangement takes place at a level below the threshold value at which the toaster is switched off. For example, the line supplying current to the resistances 501-509 may have switch 494 interposed in it, as shown in FIG. 9.

Termination of the toasting operation is indicated in the prior-art "pop-up" toasters by the noise made when the lifting device "pops up" the finished toast. Since the toaster according to the invention does not have such a pop-up mechanism, no such noise exists to alert the user to the completion of the toasting operation. However, the end of the toasting operation can be signalled to the user by operation of a blinking light and/or a buzzer which are energized when e.g. the main switch or one of the secondary switches (212; 206-211 in FIG. 7 or 357; 380-383 in FIG. 8) is opened.

Aside from the elimination of sources of mechanical failure and of the expense of pop-up mechanisms in the toaster according to the invention, the omission of this mechanism makes it possible to energize and deenergize the toaster purely electrically. In other words, it is no longer necessary to shift or depress a mechanically operating lever in order to move the bread slices into operative proximity to the heating elements. This makes it possible to use e.g. a programable timer (known per se) which performs switching operations (i.e. switching-on and/or switching-off of the toaster) at a pre-selectable time. It is particularly advantageous to use quartz-controlled clock of the type used in modern wake-up alarms. Buttons, switches or knobs may be provided at the exterior of the toaster by means of which the clock may be operated to set the time at which the toaster is to switch on and/or off. The frequency divider used in known quartz clocks (disclosed in U.S. Pat. Nos. 3,759,029 and 3,940,919) may be used to energize an audio frequency device to produce a signal alerting the user.

Each of the toasting chambers of the toaster according to the invention may have a separate time storage device with it. If so, the quartz clock can be used not only to switch the entire toaster on and/or off at predetermined times, but the heating circuit of each or any of the several toasting chambers may then be separately energized and/or de-energized at preselected times. This offers a variety of advantages. For example, bread slices may be placed in the toaster in the evening and the toasting operation may be preprogrammed for the next morning, so that e.g. one slice will be toasted and ready for consumption by one member of the family at 7 a.m., two more slices will be ready for consumption by other family members at 7:30 a.m. and so forth. Another possibility is to program the toaster so that the heating circuits of the several chambers are energized in a closely timed sequence, for example to produce two slices of toast at one time and to have two further slices ready a few minutes later, when the first two slices are consumed. This eliminates the problem which occurs when in a conventional toaster all four slices are ready simultaneously, so that the second two slices become cold while the first two are being consumed. To facilitate the operation for this latter case, an automatic sequencing arrangement may be provided which may e.g. permit energization of the heating circuits of successive chambers at two-minute or five-minute intervals. The toaster may then be provided with e.g. a rotary control which, when placed to e.g. a "two-minute interval" setting causes a slice of bread (of the pre-loaded chambers) to be toasted every two minutes.

Naturally, in the preceding as well as in the succeeding embodiments it is possible to make various changes and modifications. Naturally, the circuit embodiments herein can be used not only with toasters of the type shown in e.g. FIGS. 1-5, where a toast rack is provided as an integrated component of the toaster, but are usable with other types of toasters as well.

Figure 11:
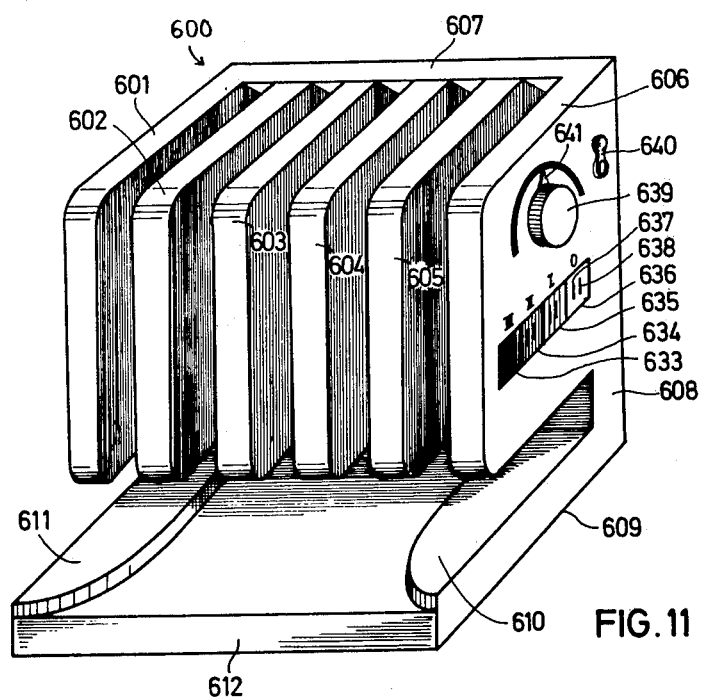
FIG. 11 is a perspective view of yet another embodiment of the toaster according to the invention, with the toast rack omitted.
Figure 12:
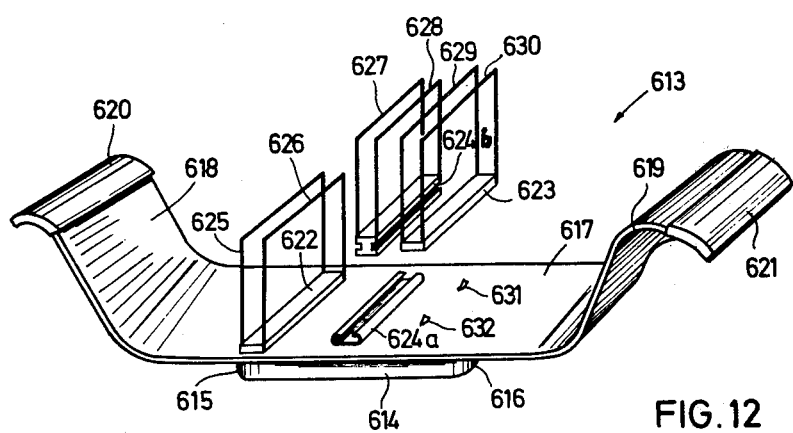
FIG. 12 is a perspective view showing the toast rack of the toaster in FIG. 11.

The toaster illustrated in FIGS. 11 and 12 has a toasting unit 600 which is so constructed that the toast rack 613 (FIG. 12) can be placed into and removed from its position in an especially simple manner. As in the preceding embodiments, the toasting unit 600 has a plurality of heating sections 601-606 (each with its own internal heating circuit) which are connected to a rear wall 607 of the unit 600, in a manner reminiscent of the embodiment of FIGS. 1 and 5. The rear wall is connected to a base 609 via a connection portion 608.

Unlike the base plates of the preceding embodiments, the one in this Figure is provided with lateral guides 610 and 611 which guide the toast rack 613 during insertion and removal. The operative effect of this arrangement is analogous to the rail and groove guides in other embodiments, but especially the insertion of the rack is greatly facilitated because there is no need for exact alignment of the rails and grooves as in the aforementioned other embodiments.

It is helpful if the base plate 609 is so constructed that its lateral edges are longer than the lateral edges of the sections 601–606, i.e. project beyond the same, as shown. This permits the rack 613 to be placed on the base plate 609 before the bread slices on the rack begin to enter into the toasting chambers formed between the sections 601–606. Insertion of the rack is also facilitated by having the inwardly directed edges of the guides 610, 611 converge towards one another and towards the heating sections in an arcuate manner—so that the broadest part of the space between them is located adjacent the front edge of base plate 609 and the space converges from there on in direction towards the heating sections with respect to which it ultimately extends parallel (see FIG. 11).

The toast rack 613 in FIG. 12 has a bottom plate 614 of preferably oval or elliptical outline. To insert this toast rack into the unit 600, it is first placed onto the projecting portion of base plate 609; in this position the relatively narrow plate 614 fits well into the open end of the space between the guides 610, 611 so that centering problems are eliminated. When the rack 613 is then pushed towards the unit 600, the lateral edges 615, 616 of the bottom plate 614 are guided by the guides 610, 611 so that each slice of bread on the rack 613 enters exactly into its assigned toasting chamber.

The rack 613 has a carrier plate 617 whose lateral edges 618,619 are bent up to form handles which are provided with heat-insulating material 620, 621 (e.g. synthetic plastic) to protect the fingers of a user. A plurality (three shown) of raised portions 622, 623, 624a, 624b are provided (portions 623, 624b are shown disconnected from plate 617) and each of these is flanked by two bread-holding frames 625–630. One of the raised portions is made removable, for the reasons discussed hereinbefore; this is the portion which is composed of the two parts 624a (rigidly mounted on plate 617) and 624b which has a double-T shaped profile and can be slipped into the U-shaped part 624a. However, the other portions 623 can also be made removable, as indicated by the projections 631, 632 which are provided on the plate 617 and can enter with a snap-action into openings (not shown) provided on the underside of the portion 623.

At least one side of the unit 600 is provided with operating controls. A linear scale has indicia O-III, each indicative of a different degree of toasting (zero is obviously the inoperative setting of the toaster). Each of these settings has a button 633–636 associated with it, by means of which it can be selected for operation. Each of these buttons has two electrical contacts at its exposed face (e.g. contacts 637, 638) which, when bridged by the contact-making skin of a user's finger, complete the respective circuit and thus select the associated setting. The term select is here used in the sense of pre-selecting, i.e. without actually energizing the toaster although the energization per se can, of course also be effected as a result of the bridging of the contacts. Moreover, each of the fields indicated by the indicia O-III can have a light arranged behind it which becomes energized when the respective button is operated.

In addition to the aforementioned controls the toaster also has a turnable knob 639 which can be used to energize and de-energize the toaster at preprogrammable times, or to energize the heating elements of its respective toasting chambers in a selectable timed sequence. The selection of the desired function is effected via a selector switch 640 of e.g. the kind described in German Published Application No. 2,528,502. Knob 639 has a pointer or other indicator 641 which moves along a dial; on being turned to its different predetermined settings the knob can become releasably arrested, as by having a portion enter into a depression.

Details of the circuit arrangement for carrying out the functions mentioned above, will be discussed subsequently.

Figure 13:
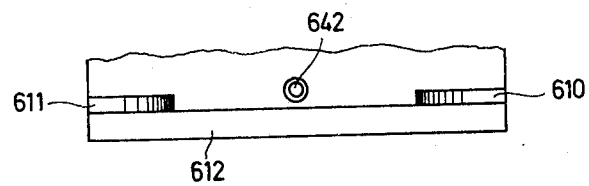
FIG. 13 is a fragmentary view, showing a detail of FIG. 11.

The toaster in FIGS. 11 and 12 has an ejecting mechanism for the rack 613. Shown in FIG. 13 is a detail view of the base plate 612 on which the guides 610, 611 are visible. Also visible in the background is a plunger 642 of the rack ejecting mechanism. It should be understood that such a mechanism is not required for proper operation of the toaster. However, its provision may be of advantage in that, after completion of the toasting operation, the mechanism is able to push the rack with its toast slices partially or all the way out of the unit 600. Since the base plate 609 projects beyond the heating sections the rack will still remain on the plate 609 even after such expulsion and will be ready for convenient removal by a user.

Figure 14:
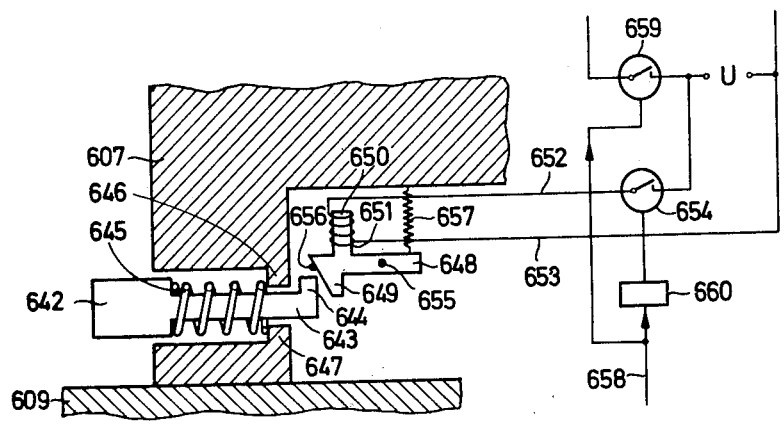
FIG. 14 is a fragmentary side view, combined with a circuit diagram, illustrating the ejecting arrangement of FIG. 11 in the inoperative position.

Details of the ejecting mechanism are shown in FIG. 14. The plunger 642 will be seen to be mounted and guided in the rear wall 607. Its shaft 643 is slidable in a passage in the rear wall and its front end is provided with an upwardly extending hook-shaped portion 644. A spring 645 surrounds shaft 643 and bears upon the plunger 642 and on projections 646, 647 of the rear wall 607. A member 648 is mounted so as to have its bevelled head 649 located above the portion 644. An upwardly directed portion 650 of member 648 is a magnet which is encircled by a solenoid coil 651 which is connected to the source U of electrical energy via conductors 652, 653 and a switch 654. Member 648 is turnable about a pivot 655 and its head 649 rests on an abutment 656. The other end of the member, i.e. the one remote from the head 649, is pulled upwardly by a spring 657 whose ends are connected to this end and to the wall 607, respectively.

Figure 15:
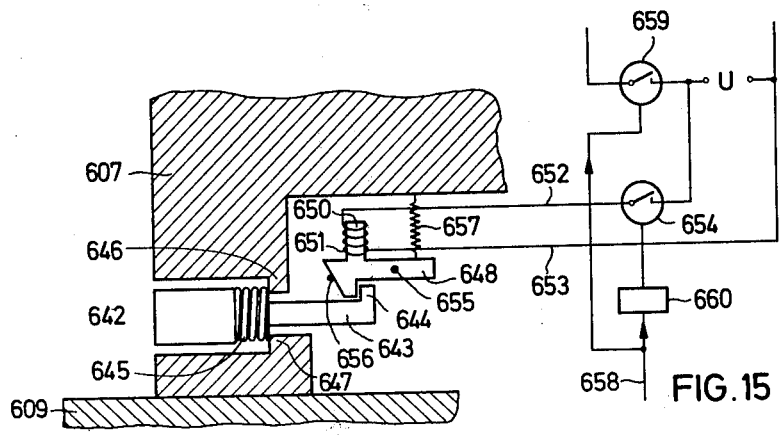
FIG. 15 is a view similar to the one in FIG. 14, but showing the mechanism in its ready-for-ejection position.

Insertion of the rack 613 into the unit 600 causes the (during insertion leading) edge of the bottom plate 614 to push against the plunger 642, inserting it into the passage in wall 607 against the opposition of spring 645. During this movement the portion 644 slides along the inclined (bevelled) surface of head 649 and lifts the head, tilting it clockwise about the pivot 655 until the portion 644 has passed beyond the head 649; at this time the head snaps behind the portion 644 under the influence of spring 657 and arrests the plunger in its position, as shown in FIG. 15. It is evident that if desired this movement of the plunger 642 from the position of FIG. 14 to that of FIG. 15 could be used to energize the heating elements of the toaster, e.g. by having the portion 644 operate a microswitch (not shown) as it moves inwardly beyond the head 649, or earlier.

When the toasting operation is completed, a de-energizing signal is supplied via the conductor 658; this signal may switch off the main switch 659 of the toaster. In addition, the signal supplied via conductor 658 also operates a monostable flip-flop 660 which then closes the switch 654 so that current can now flow through the coil 651, which attracts the magnet 651 and pulls it upwardly, causing the member 648 to tilt clockwise about the pivot 655 until the head 649 releases portion 644. This allows the spring 645 to push the plunger from the position of FIG. 15 into the position of FIG. 14 and thereby to expel the rack with its toast slices from the unit 600. After a predetermined time the flip-flop returns to its original setting, opening the switch 654 and terminating the supply of current to the coil 651.

Figure 16:
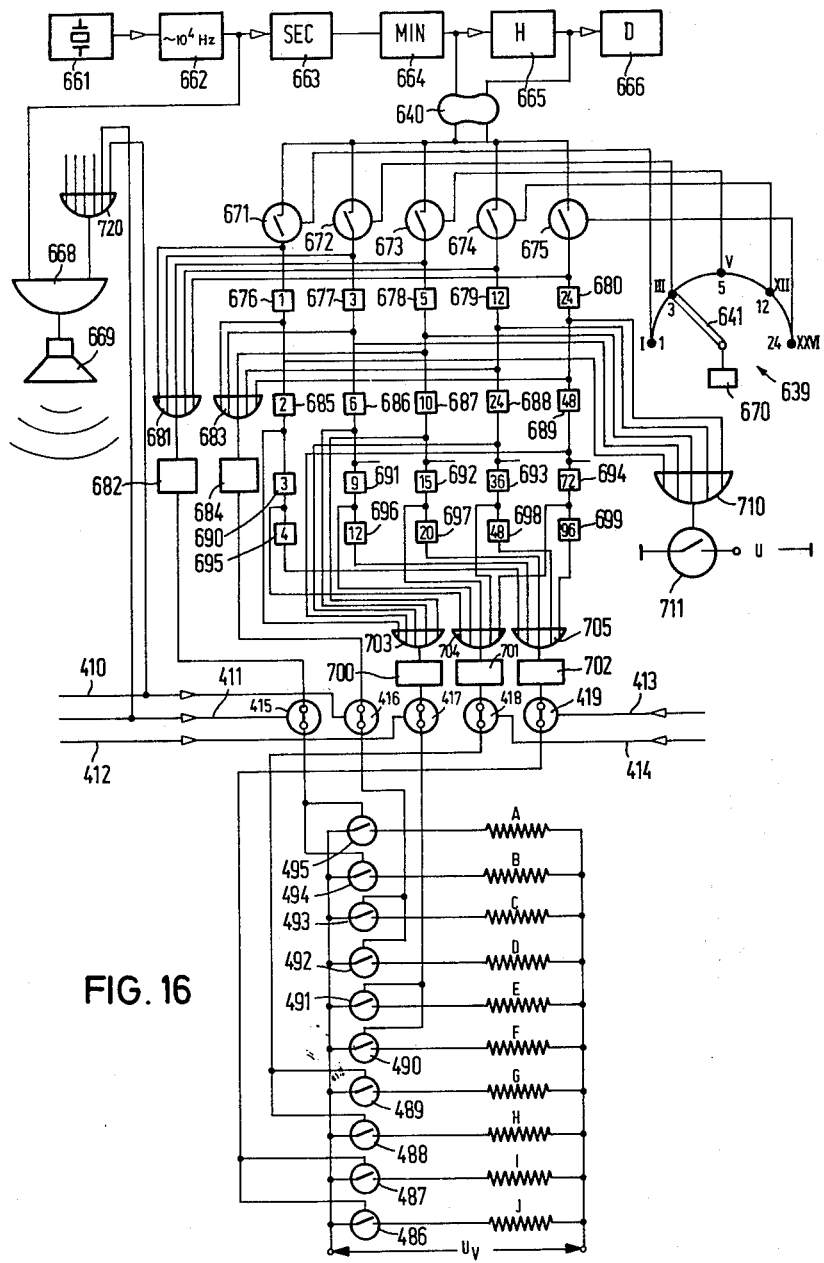
FIG. 16 is a diagram showing the programming circuit of the toaster in FIG. 11.

The circuit which is operated by the knob 639 and switch 640 (FIG. 11) is illustrated in detail in FIG. 16. It uses a known per se clock (described in U.S. Pat. No. 3,759,029) having a quartz oscillator and a frequency divider chain of which only some stages 661–666 are shown. A specific frequency, e.g. $10^4$ cycles, can be derived via conductor 667 from the frequency divider chain in known manner and supplied to an electro-acoustical transducer 669 via an AND-gate 668. The selecting switch 640 permits the user to derive either hour pulses or minute pulses from the frequency divider.

Let it, for purposes of explanation, be assumed that the switch 640 has been set to select the minute-pulse train. In that case, setting is made with respect to the arabic numerals on the dial partly surrounding the knob 639, since it is these arabic numerals which indicate a sequence of seconds. For example, when the pointer 641 is set as shown in FIG. 16, this means that the toaster is set to toast a slice of bread every three minutes. For this purpose the heating circuit of a different toasting chamber is energized every three minutes; de-energization does not necessarily follow this three-minute cycle but takes place for each toasting chamber when the circuit senses that the slice of bread in the chamber has been properly toasted. Of course, if all slices toast uniformly, the de-energization may also take place in the three-minute cycle.

The source of electrical energy is designated in FIG. 16 with reference numeral 670. Energy is supplied by it to a switch 672 which, when so energized, closes and supplies the minute pulse train to a counter 677. When the pulses appear at the counter output, the counter produces an output signal. At the same time the seconds pulse train travels via an OR gate 681 to a monostable circuit 682 which produces a constant output signal for as long as the seconds pulses are applied to its input. This output signal is supplied via switch 415 to switches 494,495 which close as a result of this, so that the energy $U_V$ is supplied to the resistances A, B.

After the slice of bread located between the heating resistances A, B has been browned (toasted) in accordance with a predetermined reference value, the switch 415 opens together with the switches 494, 495 and the resistances A, B are disconnected from the energy source.

The next slice of bread is to be toasted (according to the setting of pointer 641) three minutes later. It will be located between the resistances C and D. To initiate the toasting operation the signal which appears after three minutes at the output of the counter 677 is supplied via an OR gate 683 and an astable multi-vibrator 684 to the switch 416. The resistances C and D are switched on and off in the same manner as described with reference to the resistances A and B. The resistances E, F, G, H, I and J are energized via the counters 686, 691 and 696, and are de-energized via switches 417, 418 and 419, correspondingly.

A different operating sequence can be selected by turning the knob 639; e.g. a one-second, twelve second or twenty four-second operating repeat instead of a three-second one.

If a user desires to have the toaster energized after e.g. 1, 3, 5, 12 or 24 hours, then the switch 640 is placed into operating position in which an hour pulse train is derived from the frequency divider 665, and thereafter the desired number of hours is selected by turning knob 639 to the position I, II, V, XII or XXIV. After the thus set time has elapsed an output signal appears at one of the counters 676–680 and is supplied to the OR-gate 710 which turns on the switch 711 and thereby connects the toaster to the voltage U.

It goes without saying that it is possible to modify the circuit of FIG. 16 so as to obtain any desired other operating sequence, e.g. to toast successive slices of bread at intervals of three minutes, six minutes or in any desired order. The toaster can also be made to become energized at any desired time, rather than after the elapse of 1, 3, 5, 12 or 24 hours as mentioned above; the circuitry for this is known from clock radios and electronic alarm clocks and requires no description here.

While the invention has been illustrated and described as embodied in a toaster for bread and other food items, it is not intended to be limited to the details shown, since modifications and structural changes may be made without departing from the spirit of the invention.

What is claimed as new and desired to be protected by Letters Patent is set forth in the appended claims:

1. A toaster for bread and other food items, comprising
   a casing having at least two generally parallel upright walls defining with one another an upright space dimensioned to receive food items to be toasted, said walls having downwardly directed lower edge faces;
   a base beneath said casing and having an upper surface spaced from and defining with said lower edge faces a clearance which is open to said spaces;
   discrete carrier means insertable into and removable from said clearance and including holding means projecting from said clearance into said space for holding food items in requisite orientation;
   means for causing a food item on said carrier means to enter into said space and to be extracted therefrom;
   means for toasting food items which are located in said space; and
   cooperating guide portions on said casing and carrier for guiding the latter during said relative movement, said casing including a housing and downwardly spaced therefrom said base having an edge and on which said housing is mounted, said carrier being insertable between said base and housing; and wherein said guide portions include at least one groove formed in said base and having a cross-section which diverges in direction towards said edge in the region inwardly adjacent the same.

2. A toaster as defined in claim 1, wherein said base has a portion projecting laterally beyond said casing and upon which said carrier may be placed.

* * * * *